United States Patent
Sunohara et al.

(10) Patent No.: US 8,610,856 B2
(45) Date of Patent: Dec. 17, 2013

(54) LIQUID CRYSTAL DISPLAY DEVICE

(75) Inventors: Kazuyuki Sunohara, Kanazawa (JP); Youichi Asakawa, Ishikawa-gun (JP)

(73) Assignee: Japan Display Inc., Tokyo (JP)

( * ) Notice: Subject to any disclaimer, the term of this patent is extended or adjusted under 35 U.S.C. 154(b) by 288 days.

(21) Appl. No.: 13/176,027

(22) Filed: Jul. 5, 2011

(65) Prior Publication Data

US 2012/0019759 A1 Jan. 26, 2012

(30) Foreign Application Priority Data

Jul. 21, 2010 (JP) ................. 2010-164243

(51) Int. Cl.
*G02F 1/1333* (2006.01)

(52) U.S. Cl.
USPC ........... 349/138; 349/122; 349/123; 349/132; 349/136; 349/139

(58) Field of Classification Search
USPC ............. 349/56, 84, 122, 123, 132, 136, 138, 349/139
See application file for complete search history.

(56) References Cited

U.S. PATENT DOCUMENTS

| | | |
|---|---|---|
| 6,256,081 B1 | 7/2001 | Lee et al. |
| 6,646,707 B2 | 11/2003 | Noh et al. |
| 6,995,394 B2 * | 2/2006 | Hong et al. .................. 257/59 |
| 7,964,876 B2 * | 6/2011 | Umezaki ..................... 257/72 |
| 2011/0122114 A1 | 5/2011 | Tanaka et al. |

FOREIGN PATENT DOCUMENTS

| | | |
|---|---|---|
| JP | 2000-10110 | 1/2000 |
| JP | 2006-350282 A | 12/2006 |
| JP | 2007-183628 A | 7/2007 |
| JP | 2009-53658 A | 3/2009 |
| JP | 2009-75188 A | 4/2009 |
| JP | 2010-152158 A | 7/2010 |

OTHER PUBLICATIONS

Office Action issued May 22, 2012 in Japanese Patent Application No. 2010-164243 with English language translation.

* cited by examiner

*Primary Examiner* — Jennifer Doan
(74) *Attorney, Agent, or Firm* — Oblon, Spivak, McClelland, Maier & Neustadt, L.L.P.

(57) ABSTRACT

According to one embodiment, a liquid crystal display device includes a first gate line, a second gate line, a common line, a first electrode, an insulation film, and a second electrode. The common line includes a first edge, which has a non-linear shape and is formed at a first distance from the first gate line, and a second edge, which is formed at a second distance, which is shorter than the first distance, from the second gate line. The first electrode is disposed between the first gate line and the second gate line and put in contact with the common line. The insulation film is disposed above the first electrode. The second electrode is disposed above the insulation film, opposed to the first electrode, extending immediately above the first edge of the common line, and having a slit formed therein.

5 Claims, 9 Drawing Sheets

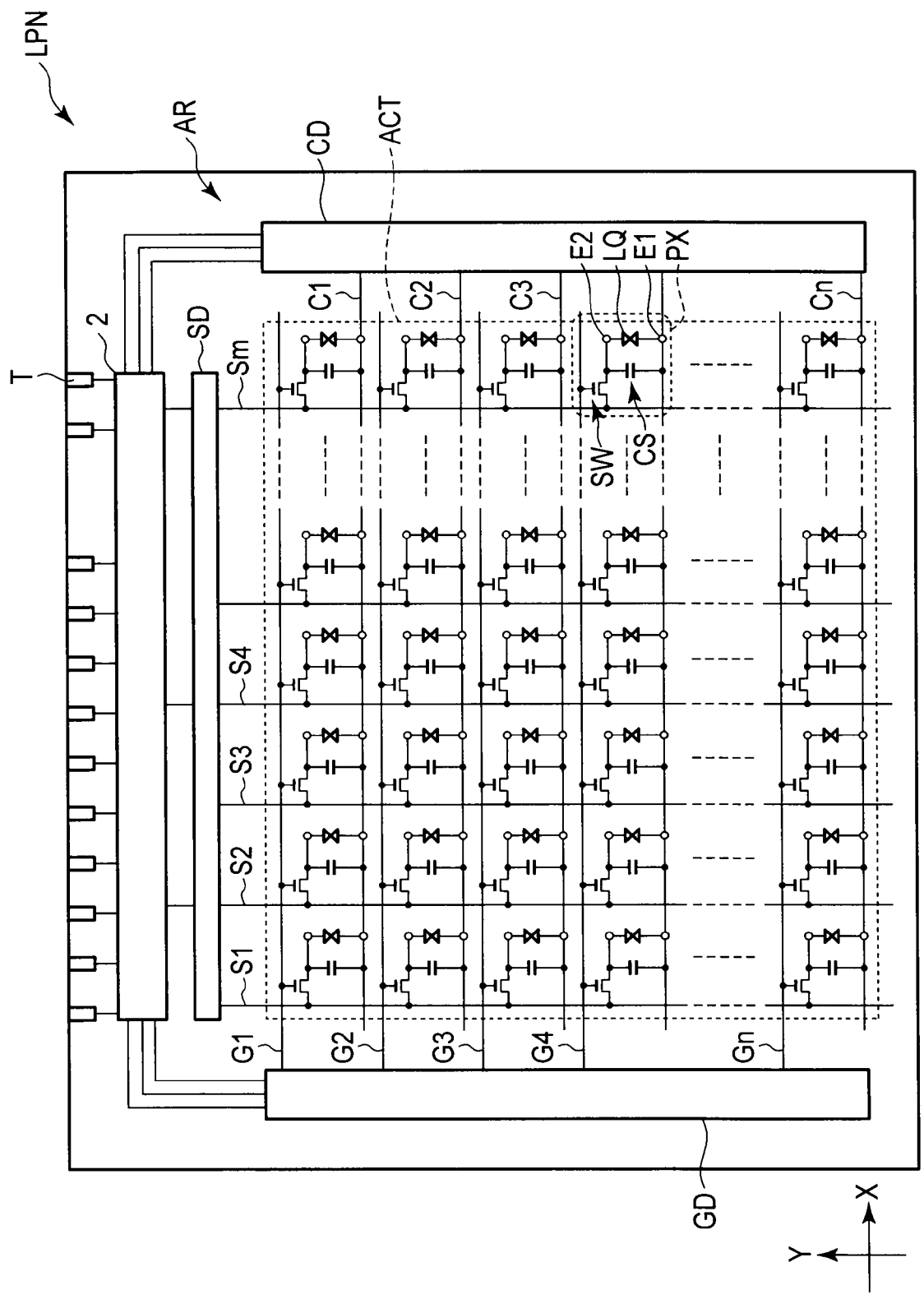
F I G. 2

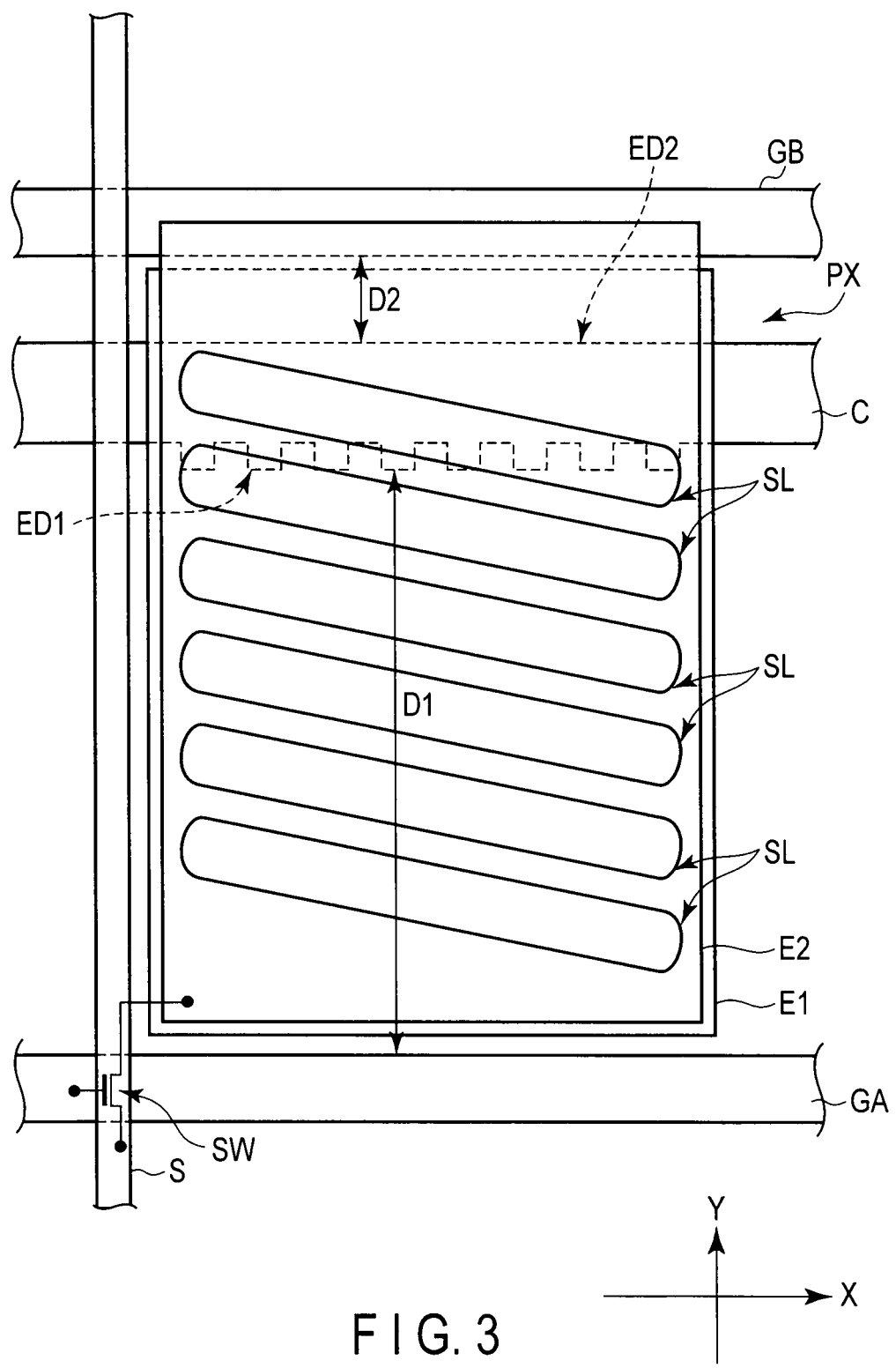
F I G. 3

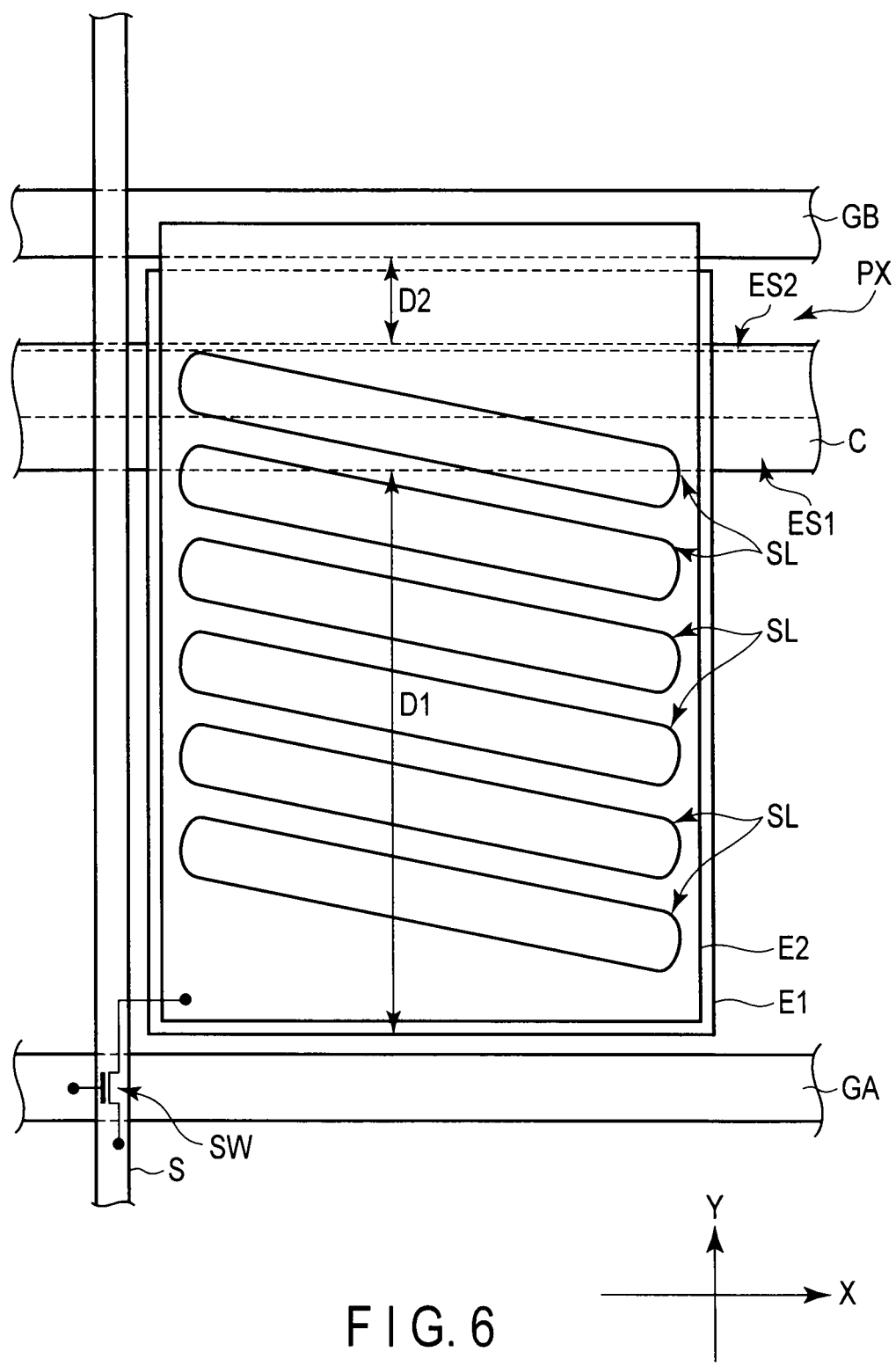
F I G. 6

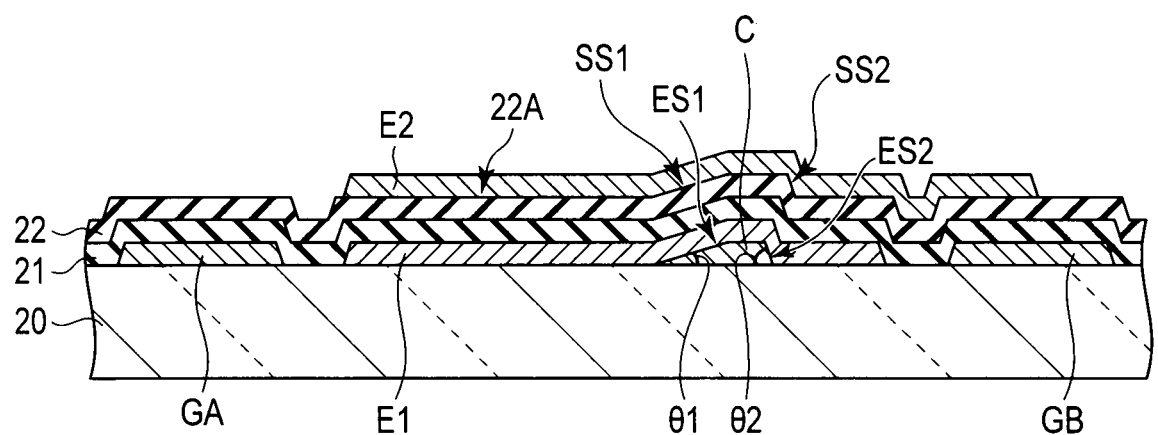
F I G. 7

LIQUID CRYSTAL DISPLAY DEVICE

CROSS-REFERENCE TO RELATED APPLICATIONS

This application is based upon and claims the benefit of priority from Japanese Patent Application No. 2010-164243, filed Jul. 21, 2010; the entire contents of which are incorporated herein by reference.

FIELD

Embodiments described herein relate generally to a liquid crystal display device.

BACKGROUND

By virtue of such features as light weight, small thickness and low power consumption, liquid crystal display devices have been used in various fields as display devices of OA equipment such as a personal computer, a TV, etc. In recent years, liquid crystal display devices have also been used as display devices of a portable information terminal device such as a mobile phone, a car navigation apparatus, and a game machine, etc.

In such liquid crystal display devices, there has been an increasing demand for the improvement of fineness of an image according to an increase in information amount, the improvement of display speed for adaptivity to a moving picture, and the realization of a wider viewing angle. With the advancement in microfabrication of a TFT (Thin Film Transistor) array structure, there have been proposed, as liquid crystal modes which meet such demands, an OCB (Optically Compensated Bend) system using a nematic liquid crystal, a VAN (Vertical Aligned Nematic) system, a HAN (Hybrid Aligned Nematic) system, a it alignment system, an IPS (In-Plane Switching) system, and an FFS (Fringe Field Switching) system.

In particular, the FFS system has already been adopted in various fields as the liquid crystal display mode which realizes a high contrast, a wide viewing angle and a high transmittance. In a characteristic structure of the FFS system, two kinds of transparent electrodes, which are opposed to each other with an insulation layer being interposed, are provided on the same substrate, and a slit pattern is provided on the upper-layer electrode. The alignment of liquid crystal molecules is controlled by controlling an electric field which is produced between the two kinds of transparent electrodes.

BRIEF DESCRIPTION OF THE DRAWINGS

FIG. 2 is a view which schematically shows the structure and an equivalent circuit of a liquid crystal display panel shown in FIG. 1.

FIG. 3 is a schematic plan view showing a first structure example of the structure of a pixel in an array substrate shown in FIG. 2, as viewed from a counter-substrate side.

FIG. 6 is a schematic plan view showing a third structure example of the structure of the pixel in the array substrate shown in FIG. 2, as viewed from the counter-substrate side.

FIG. 7 is a schematic cross-sectional view of a common line shown in FIG. 6.

DETAILED DESCRIPTION

Figure 1:
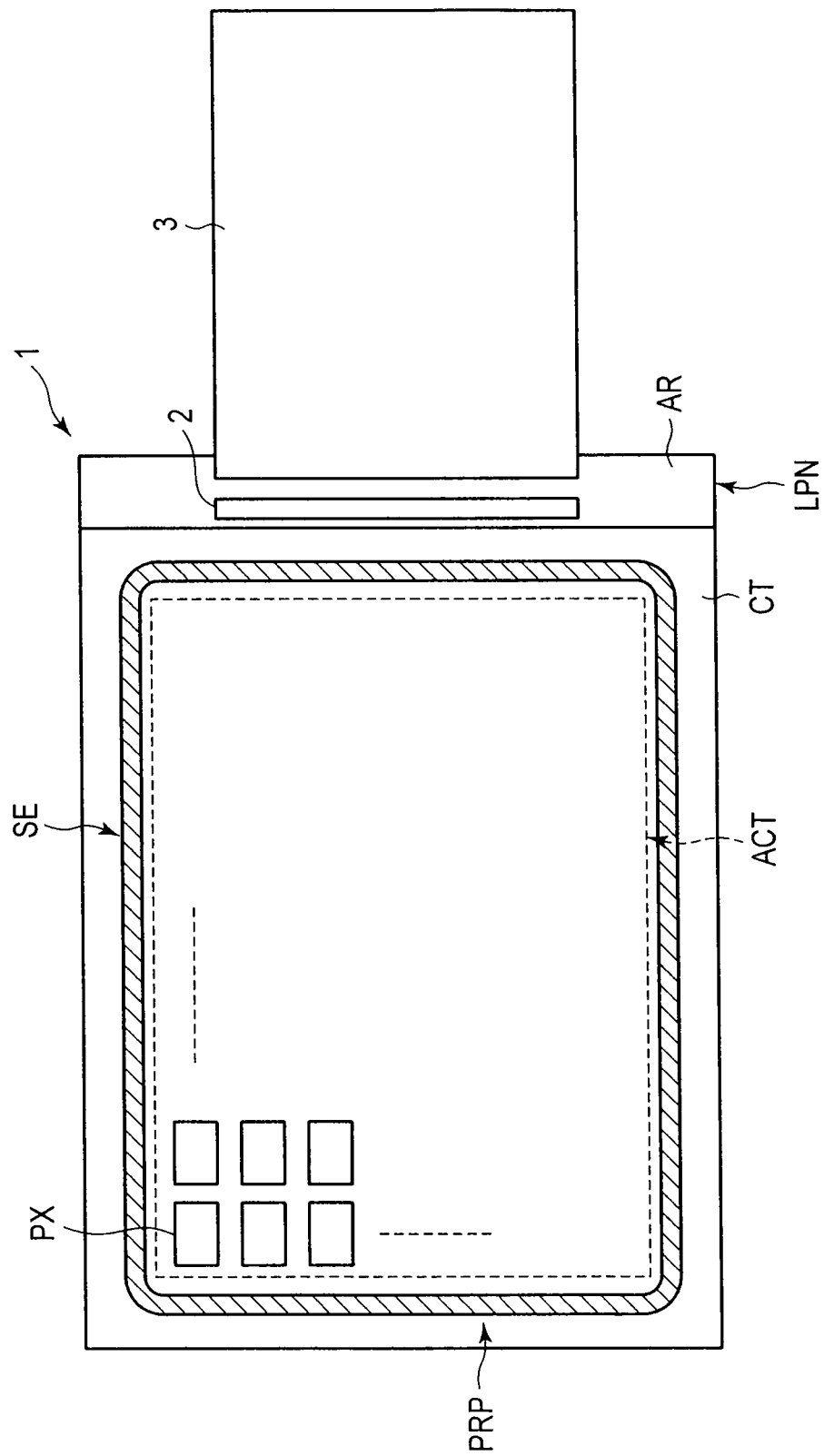
FIG. 1 is a plan view which schematically shows the structure of a liquid crystal display device according to an embodiment.

In general, according to one embodiment, a liquid crystal display device comprises: a first substrate including a first gate line, a second gate line, a common line, a first electrode, an insulation film, and a second electrode, the common line being disposed between the first gate line and the second gate line and including a first edge, which has a non-linear shape and is formed at a first distance from the first gate line, and a second edge, which is formed at a second distance, which is shorter than the first distance, from the second gate line, the first electrode being disposed between the first gate line and the second gate line and put in contact with the common line, the insulation film being disposed on the first electrode, and the second electrode being disposed on the insulation film, opposed to the first electrode, extending immediately above the first edge of the common line, and having a slit formed therein; a second substrate opposed to the first substrate; and a liquid crystal layer held between the first substrate and the second substrate.

According to another embodiment, a liquid crystal display device comprises: a first substrate including an insulative substrate, a first gate line and a second gate line which are disposed on the insulative substrate, a common line, a first electrode, an insulation film, and a second electrode, the common line being disposed between the first gate line and the second gate line on the insulative substrate and including a first end surface, which is formed at a first distance from the first gate line and is inclined at a first angle to the insulative substrate, and a second end surface, which is formed at a second distance, which is shorter than the first distance, from the second gate line and is inclined at a second angle, which is greater than the first angle, to the insulative substrate, the first electrode being disposed between the first gate line and the second gate line on the insulative substrate and put in contact with the common line, the insulation film being disposed on the first electrode, and the second electrode being disposed on the insulation film, opposed to the first electrode, extending immediately above the first end surface of the common line, and having a slit formed therein; a second substrate opposed to the first substrate; and a liquid crystal layer held between the first substrate and the second substrate.

According to another embodiment, a liquid crystal display device comprises: a first substrate including a gate line formed in a first direction, a source line formed in a second direction crossing the first direction, a common line formed in a third direction crossing the first direction and the second direction, a first electrode which is put in contact with the common line, an insulation film disposed on the first electrode, and a second electrode which is disposed on the insulation film, is opposed to the first electrode, extends immediately above the common line and has a slit formed therein; a second substrate opposed to the first substrate; and a liquid crystal layer held between the first substrate and the second substrate.

According to another embodiment, a liquid crystal display device comprises: a first substrate including a gate line formed in a first direction, a source line formed in a second direction crossing the first direction, a common line which is formed in the first direction and includes a first wiring portion formed at a first distance from the gate line and a second wiring portion which is continuous with the first wiring portion and is formed at a second distance, which is greater than the first distance, from the gate wiring, a first electrode which is put in contact with the common line, an insulation film disposed on the first electrode, and a second electrode which is disposed on the insulation film, is opposed to the first electrode, extends immediately above the first wiring portion and the second wiring portion of the common line, and has a slit formed therein; a second substrate opposed to the first substrate; and a liquid crystal layer held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a plan view which schematically shows the structure of a liquid crystal display device according to an embodiment.

Specifically, a liquid crystal display device 1 comprises an active-matrix-type liquid crystal display panel LPN, and a driving IC chip 2 and a flexible wiring board 3 which are connected to the liquid crystal display panel LPN.

The liquid crystal display panel LPN is configured to include an array substrate AR as a first substrate, a counter-substrate CT as a second substrate which is disposed to be opposed to the array substrate AR, and a liquid crystal layer (not shown) which is disposed between the array substrate AR and the counter-substrate CT. The array substrate AR and the counter-substrate CT are attached by a sealant SE. The liquid crystal layer (not shown) is held in an inside surrounded by the sealant SE in a cell gap which is created between the array substrate AR and the counter-substrate CT. The sealant SE is formed, for example, in a substantially rectangular frame shape between the array substrate AR and the counter-substrate CT. The sealant SE is formed of, e.g. a resin material.

The liquid crystal display panel LPN includes a substantially rectangular active area ACT, which displays an image, in the inside surrounded by the sealant SE. The active area ACT is composed of a plurality of pixels PX which are arrayed in a matrix of m×n (m and n are positive integers). The driving IC chip 2 and flexible wiring board 3 are mounted on the array substrate AR in a peripheral area PRP on the outside of the active area ACT.

FIG. 2 is a view which schematically shows the structure and an equivalent circuit of the liquid crystal display panel LPN shown in FIG. 1. A description is given of the structure to which a liquid crystal mode of an FFS system is applied. In the FFS system, the array substrate AR of the liquid crystal display panel LPN includes a first electrode (also referred to as "lower electrode" or "common electrode") E1 and a second electrode (also referred to as "upper electrode" or "pixel electrode") E2. Liquid crystal molecules of a liquid crystal layer LQ are switched (or driven) by mainly making use of a transverse electric field (i.e. an electric field substantially parallel to a major surface of the substrate) of a fringe electric field which is produced between the first electrode E1 and the second electrode E2.

The array substrate AR includes, in the active area ACT, an n-number of gate lines G (G1 to Gn) which are formed in a first direction X, an m-number of source lines S (S1 to Sm) which are formed in a second direction Y crossing the first direction X, a switching element SW which is disposed at each of pixels PX and is electrically connected to the gate line G and source line S, the first electrode E1 which is disposed at each pixel PX and is electrically connected to a common line C, and the second electrode E2 which is disposed at each pixel PX, is opposed to the first electrode, and is electrically connected to the switching element SW. In this example, the first direction X and second direction Y are substantially perpendicular. The liquid crystal layer LQ is interposed between the first electrode E1 and the second electrode E2. A storage capacitance CS is formed, for example, between the first electrode E1 and the second electrode E2.

Each of the gate lines G is led out of the active area ACT and is connected to a first driving circuit GD. Each of the source lines S is led out of the active area ACT and is connected to a second driving circuit SD. Each of the common lines C is led out of the active area ACT and is connected to a third driving circuit CD. The first driving circuit GD, second driving circuit SD and third driving circuit CD are formed on the array substrate AR and are connected to the driving IC chip 2.

In the example illustrated, the driving IC chip 2 is mounted on the array substrate AR on the outside of the active area ACT. The depiction of the flexible wiring board is omitted, and terminals T for connection to the flexible wiring board are formed on the array substrate AR. These terminals T are connected to the driving IC chip 2 via various wiring lines.

FIG. 3 is a schematic plan view showing a first structure example of the structure of the pixel PX in the array substrate AR shown in FIG. 2, as viewed from the counter-substrate CT side.

A first gate line GA and a second gate line GB are formed in a substantially linear shape along the first direction X. The source line S is formed in a substantially linear shape along the second direction Y. The switching element SW is disposed in the vicinity of an intersection between the first gate line GA and the source line S. The switching element SW is electrically connected to the first gate line GA and source line S.

A common line C is disposed between the first gate line GA and second gate line GB and is spaced apart from the first gate line GA and second gate line GB. In addition, the common line C is positioned with a bias to the second gate line GB side between the first gate line GA and second gate line GB. Specifically, the common line C is positioned close to the second gate line GB. In other words, in the pixel PX, a first distance D1 from the first gate line GA to the common line C in the second direction Y is greater than a second distance D2 from the second gate line GB to the common line C in the second direction Y. The first distance D1 is a distance between mutually opposed edges of the first gate line GA and common line C, and the second distance D2 is a distance between mutually opposed edges of the second gate line GB and common line C.

The common line C includes a first edge ED1 which is opposed to the first gate line GA, and a second edge ED2 which is opposed to the second gate line GB. The first edge ED1 is formed at the first distance D1 from the first gate line GA. The second edge ED2 is formed at the second distance D2, which is shorter than the first distance D1, from the second gate line GB.

The plan-view shapes of the first edge ED1 and second edge ED2 are asymmetrical. Specifically, the first edge ED1 has a non-linear shape, and the second edge ED2 has a substantially linear shape. In the example illustrated, the first edge ED1 is formed in a comb shape, or a rectangular wave shape with substantially constant cycles. Thus, the length of the first edge ED1 is greater than the length of the second edge ED2. In the meantime, the first edge ED1 is formed in a non-linear shape, at least in each pixel PX or at least in an area overlapping the second electrode E2. That part of the first edge ED1, which overlaps the source line S, may be formed in a non-linear shape or in a linear shape.

The first electrode E1 is formed in a manner to correspond to each pixel PX. In the example illustrated, the first electrode E1 is formed in a substantially rectangular shape. The first electrode E1 is disposed between the first gate line GA and second gate line GB and is spaced apart from the first gate line GA and second gate line GB. In addition, the first electrode E1 is put in contact with the common line C of a common potential.

The second electrode E2 is formed in a manner to correspond to each pixel PX and is electrically connected to the switching element SW. In the example illustrated, the second electrode E2 is formed in a substantially rectangular shape. The second electrode E2 is disposed above the first electrode E1 between the first gate line GA and second gate line GB, and is opposed to the first electrode E1. In addition, the second electrode E2 extends immediately above the first edge ED1 of the common line C. In the example illustrated, the second electrode E2 passes immediately above the common line C, extends immediately above the first edge ED1 and second edge ED2, and further extends immediately above the second gate line GB.

Besides, a plurality of slits SL is formed in the second electrode E2. In the example illustrated, the respective slits SL are formed in parallel, and extend in a substantially linear shape in a direction crossing the first direction X and second direction Y. Specifically, the direction of extension of the slits SL is a direction crossing the common line C and source line S. In the meantime, the direction of extension of the slits SL may be another direction. All the slits SL of the second electrode E2 are formed above the first electrode E1. Most of the slits SL are located immediately above an area between the first gate line GA and common line C. Some of the slits SL are formed near a position immediately above the first edge ED1 of the common line C. Meanwhile, no slit SL is formed near a position immediately above the second edge ED2. Specifically, as shown in FIG. 3, no such slit SL is formed as to extend from immediately above the common line C, toward the second gate line GB over the second edge ED2.

Figure 4:
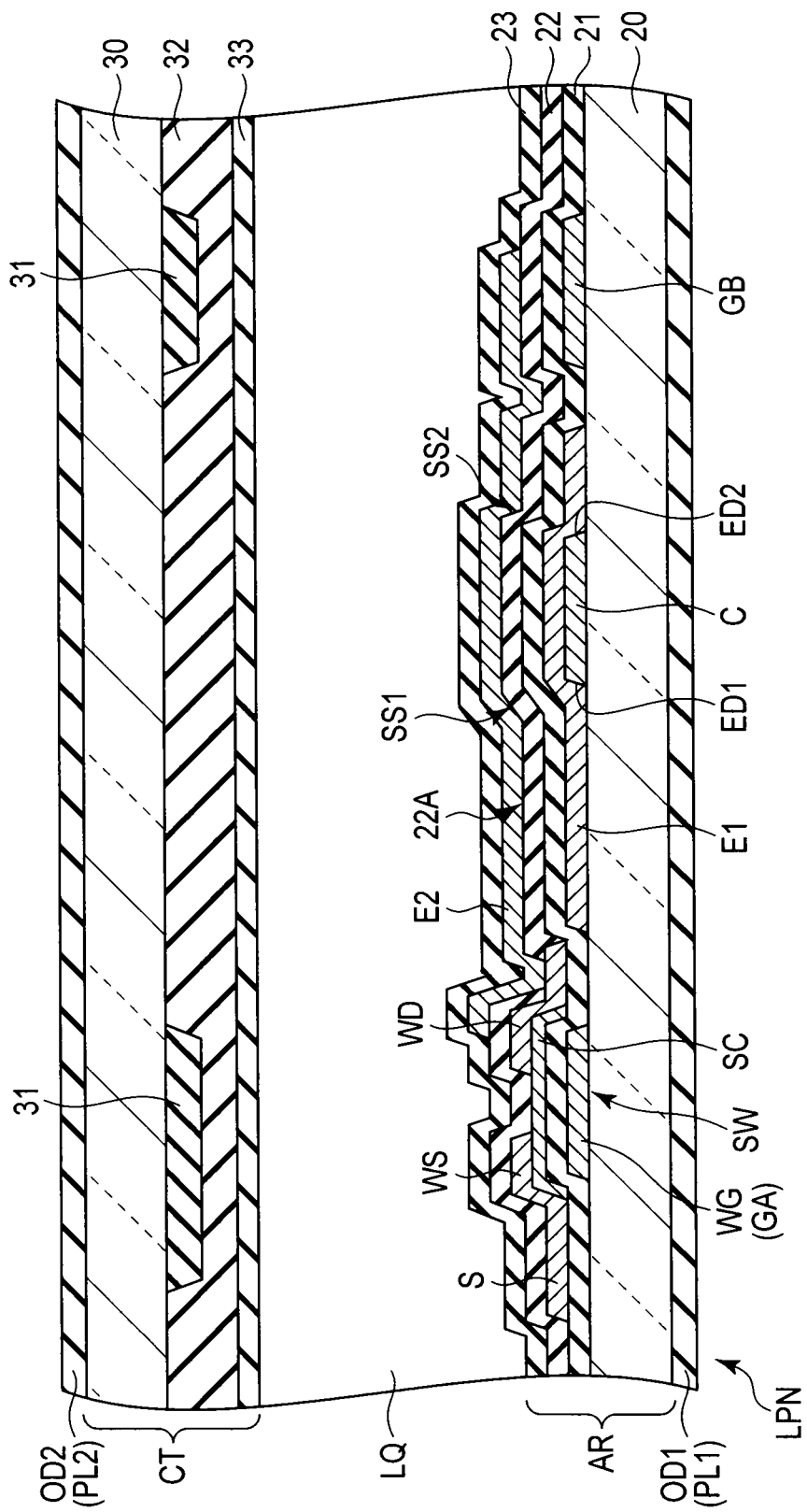
FIG. 4 is a view which schematically shows a cross-sectional structure of the liquid crystal display panel, illustrating a cross section of the pixel shown in FIG. 3.

FIG. 4 is a view which schematically shows a cross-sectional structure of the liquid crystal display panel LPN including the switching element SW in the pixel PX shown in FIG. 3.

Specifically, the array substrate AR is formed by using a first insulative substrate 20 having light transmissivity, such as a glass substrate. The array substrate AR includes the switching element SW on an inner surface of the first insulative substrate 20 (i.e. the surface opposed to the counter-substrate CT). The switching element SW shown in FIG. 4 is a bottom-gate-type thin-film transistor (TFT), which includes a semiconductor layer SC that is formed of amorphous silicon. However, the structure of the switching element SW is not limited to this example. For example, the switching element SW may be a top-gate-type thin-film transistor, or may include a semiconductor layer SC which is formed of polysilicon.

A gate electrode WG of the switching element SW is formed on the first insulative substrate 20. The gate electrode WG is electrically connected to the first gate line GA. In the example illustrated, the gate electrode WG is formed integral with the first gate line GA. In addition, the common line C and the second gate line GB are disposed on the first insulative substrate 20. The gate electrode WG, first gate line GA, second gate line GB and common line C are formed of the same electrically conductive material and can be formed in the same process.

The first electrode E1 is formed on the first insulative substrate 20. The first electrode E1 is positioned between the first gate line GA (or gate electrode WG) and the second gate line GB, and is put in contact with the common line C. The first electrode E1 is formed of a light-transmissive electrically conductive material, for example, a transparent oxide electrically conductive material such as an indium tin oxide (ITO) or an indium zinc oxide (IZO).

The gate electrode WG, first gate line GA, second gate line GB, common line C and first electrode E1 are covered with a first interlayer insulation film 21. The first interlayer insulation film 21 is also disposed on the first insulative substrate 20.

The semiconductor layer SC of the switching element SW is disposed on the first interlayer insulation film 21. The semiconductor layer SC is disposed immediately above the gate electrode WG. A source electrode WS and a drain electrode WD of the switching element SW are disposed on the first interlayer insulation film 21. Each of the source electrode WS and drain electrode WD is put in contact with the semiconductor layer SC. The source electrode WS is electrically connected to the source line S. In the example illustrated, the source electrode WS is formed integral with the source line S.

The gate electrode WG, source electrode WS and drain electrode WD of the switching element SW, the first gate line GA, the second gate line GB, the common line C and the source line S are formed of an electrically conductive material such as molybdenum, aluminum, tungsten or titanium.

The source electrode WS and drain electrode WD are covered with a second interlayer insulation film 22. In addition, the second interlayer insulation film 22 is also disposed on the first interlayer insulation film 21. The first interlayer insulation film 21 and second interlayer insulation film 22 are formed of an inorganic material such as silicon nitride (SiN).

The second electrode E2 is disposed on the second interlayer insulation film 22. The second electrode E2 is connected to the drain electrode WD via a contact hole which penetrates the second interlayer insulation film 22. The second electrode E2, like the first electrode E1, is formed of a transparent electrically conductive material such as ITO or IZO.

The second electrode E2 is opposed to the first electrode E1 via the first interlayer insulation film 21 and second interlayer insulation film 22. The second electrode E2 extends immediately above the common line C including the first edge ED1 and second edge ED2. Further, the second electrode E2 extends immediately above the second gate line GB. Although the slits SL, which are opposed to the first electrode E1, are formed in the second electrode E2, the depiction of the slits SL is omitted in this example. The second electrode E2 and the second interlayer insulation film 22 are covered with a first alignment film 23.

On the other hand, the counter-substrate CT is formed by using a second insulative substrate 30 having light transmissivity, such as a glass substrate. The counter-substrate CT includes a black matrix 31, which partitions the pixels PX, and a color filter 32, which is disposed in each pixel, on the inner surface of the second insulative substrate 30 (i.e. the surface facing the array substrate AR).

The black matrix 31 is disposed on the second insulative substrate 30 and is positioned immediately above the wiring portions such as the gate line G, source line and switching element SW provided on the array substrate AR. The black matrix 31 is formed in a lattice shape or in stripes. The black matrix 31 is formed of a light-blocking metallic material such as a black-colored resin material or chromium (Cr).

The color filter layer 32 is disposed on the second insulative substrate 30. A part of the color filter layer 32 is laid over the black matrix 31. Although not described in detail, the color filter 32 includes a red color filter which is disposed to correspond to a red pixel, a blue color filter which is disposed to correspond to a blue pixel, and a green color filter which is disposed to correspond to a green pixel. The red color filter, blue color filter and green color filter are formed of, for example, resin materials which are colored in the respective colors.

The color filter 32 is covered with a second alignment film 33. The first alignment film 23 and second alignment film 33 are formed of, for example, polyimide which exhibits horizontal alignment properties. In addition, the first alignment film 23 and second alignment film 33 are subjected to rubbing treatment in a direction which is substantially parallel to the direction of extension of the slits SL. The rubbing direction of the first alignment film 23 and the rubbing direction of the second alignment film 33 are parallel to each other, but are opposite to each other (i.e. different over 180° in the plane).

In the above-described liquid crystal mode which makes use of the transverse electric field, it is desirable that the surface of the counter-substrate CT, which is in contact with the liquid crystal layer LQ, be planar. The counter-substrate CT may further include an overcoat layer between the black matrix 31 and color filter 32, on the one hand, and the second alignment film 33, on the other hand. Such an overcoat layer is formed of, for example, a transparent resin material.

The above-described array substrate AR and counter-substrate CT are disposed such that the first alignment film 23 and second alignment film 33 face each other. In this case, spacers (e.g. columnar spacers which are formed of resin material so as to be integral with the array substrate AR or counter-substrate CT), which are not shown, are disposed between the array substrate AR and counter-substrate CT, and thereby a predetermined cell gap is created. The array substrate AR and counter-substrate CT are attached by a sealant (not shown) in the state in which the predetermined cell gap is created.

The liquid crystal layer LQ is composed of a liquid crystal material with a positive dielectric anisotropy, which is sealed in the cell gap that is created between the first alignment film 23 of the array substrate AR and the second alignment film 33 of the counter-substrate CT.

A first optical element OD1 including a first polarizer PL1 is disposed on one of the outer surfaces of the liquid crystal display panel LPN, that is, the outer surface of the first insulative substrate 20 which constitutes the array substrate AR. In addition, a second optical element OD2 including a second polarizer PL2 is disposed on the other outer surface of the liquid crystal display panel LPN, that is, the outer surface of the second insulative substrate 30 which constitutes the counter-substrate CT. The polarization axis of the first polarizer PL1 is perpendicular to the polarization axis of the second polarizer PL2. Each of the first optical element OD1 and second optical element OD2 may include a retardation plate.

In the FFS system of a normally black mode, black is displayed at a time of no electric field, at which no electric field is produced between the first electrode E1 and second electrode E2. On the other hand, when an electric field is produced between the first electrode E1 and second electrode E2, white is displayed by transmission of light through, in particular, the neighborhood of edges of the slits SL in the pixel PX. Specifically, the transmittance of the pixel PX become higher as the edge length of the slits increases, or the number of edges of the slits SL increases. Thus, many slits SL are formed in the second electrode E2.

In the second electrode E2 in which the slits SL are formed, potential is supplied to that part of the second electrode E2, which is other than the slits SL and is left. There is a concern that a sufficient area of this left part cannot be secured and, in particular, the second electrode E2 is made discontinuous due to a step at the part thereof overlapping the underlying wiring. If such a defect occurs, since no potential can be supplied to a part of the second electrode E2, the luminance of the pixel would lower. Further, since a pixel area, which is affected by the gate line potential, and a pixel area, which is hardly affected by the gate line potential, are connected with a high resistance, this becomes a cause of burn-in.

In the present embodiment, since the second electrode E2 in which the slits SL are formed extends immediately above the common line C, the second electrode E2 is disposed in a manner to climb over the step due to the common line C. In the example shown in FIG. 4, in the case where the second electrode E2 is made discontinuous near the region immediately above the first edge ED1 of the common line C, the part of the second electrode E2 between the first gate line GA and the vicinity of the first edge ED1 is electrically connected to the switching element SW, while the part of the second electrode E2 between the common line C and the vicinity of the second gate line GB would be set in a floating state.

Taking the above into account, in the above-described first structure example, the common line C includes the substantially linear second edge ED2 on the second gate line GB side and the non-linear first edge ED1 on the first gate line GA side. The first electrode E1, first interlayer insulation film 21 and second interlayer insulation film 22 are stacked on the common line C including the first edge ED1 and second edge ED2.

A surface 22A of the second interlayer insulation film 22, which is the underlayer of the second electrode E2, includes slanting surfaces SS1 and SS2 which correspond to the shapes of the first edge ED1 and second edge ED2, respectively. Since the length of the first edge ED1 is greater than the length of the second edge ED2, the slanting surface SS1, which is formed above the first edge ED1, has a forward taper shape which is gentler than the slanting surface SS2 that is formed above the second edge ED2. In short, the slanting surface SS1 is gentler than the slanting surface SS2.

The second electrode E2, which is disposed on the surface 22A of the second interlayer insulation film 22, tends to be made discontinuous at a steep slating surface. However, since the slating surface SS1, which is formed near the region immediately above the first edge ED1, is a gentle slanting surface, the second electrode E2 is formed to climb over the slanting surface SS1 without discontinuity. Therefore, even in the case where the slits SL are formed in the second electrode E2 near the region above the first edge ED1 and the area of that part of the second electrode E2, which is other than the slits SL and is left, is relatively small, it is possible to suppress the occurrence of discontinuity of the second electrode E2.

By suppressing the occurrence of discontinuity of the second electrode E2, as described above, it is possible to suppress the occurrence of non-uniform display or burn-in when an electric field is applied between the first electrode E1 and second electrode E2. Moreover, many slits SL can be disposed without the influence of the shape of the underlayer of the second electrode E2, and a high transmittance can be obtained. Furthermore, a wide viewing angle, which is the feature of the FFS system, can be realized. Therefore, a good display quality can be realized.

In the meantime, in the vicinity of the region above the second edge ED2, the slit SL is not formed in the second electrode E2. Hence, even if the slating surface SS2 is steep, the discontinuity of the second electrode E2 tends to hardly occur. However, in the case where the slit SL is formed near the region above the second edge ED2, it is desirable to form the second edge ED2 in a non-linear shape, like the first edge ED1, thereby to suppress the occurrence of discontinuity of the second electrode E2.

As has been described above, in order to suppress the occurrence of discontinuity of the second electrode E2, it is effective to sufficiently increase the edge length of the underlayer wiring of the second electrode E2. However, this may cause a decrease in aperture ratio or nonuniformity in aperture ratio. According to the study by the inventor, it was confirmed that it is desirable to form the non-linear first edge ED1 such that the edge length thereof is about 1.1 to 2.0 times greater than the edge length of the linear second edge ED2.

Next, other structure examples of the present embodiment will be described. The same structural parts as those of the first structure example are denoted by like reference numerals, and a description thereof is omitted.

Figure 5:
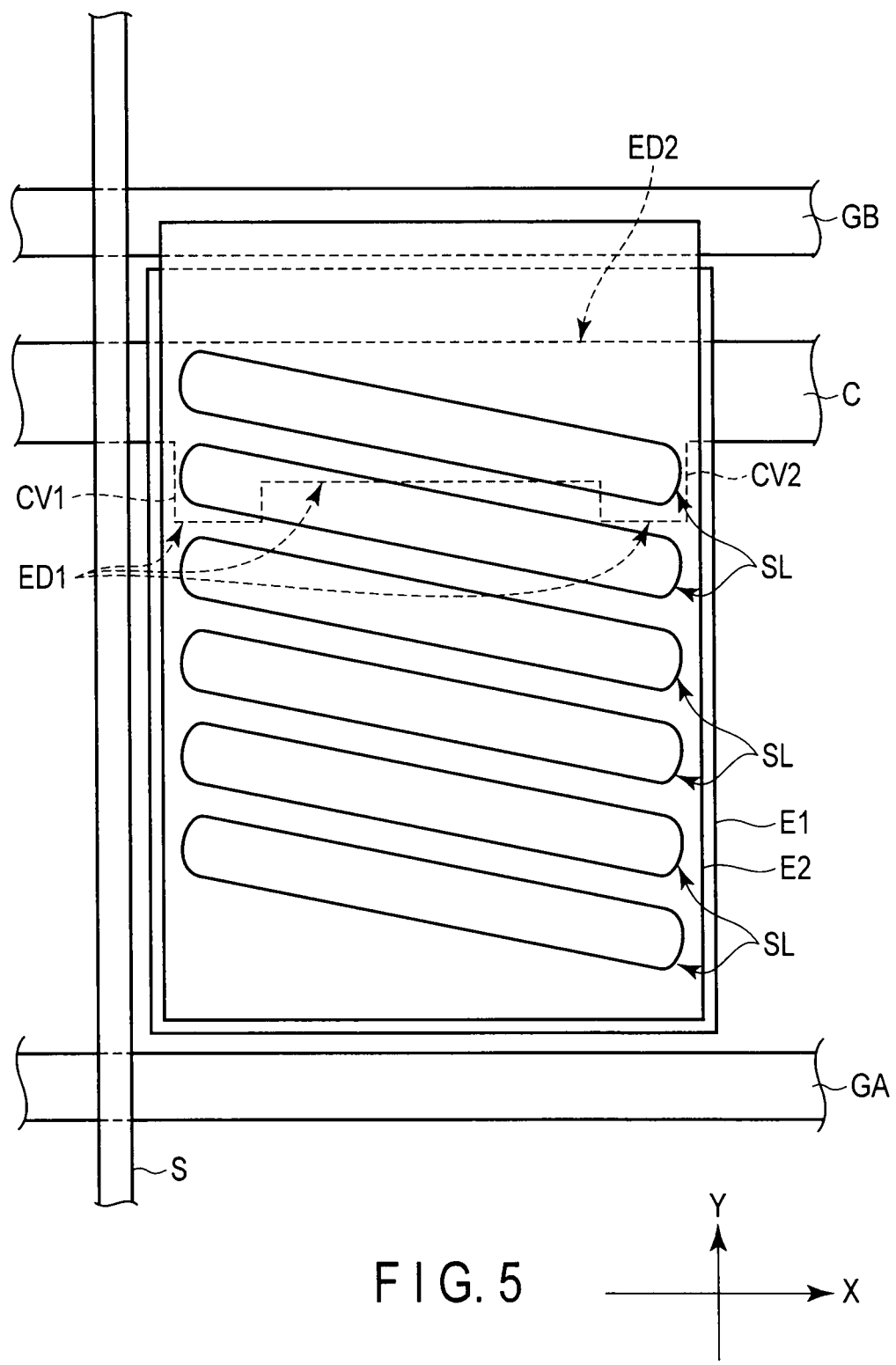
FIG. 5 is a schematic plan view showing a second structure example of the structure of the pixel in the array substrate shown in FIG. 2, as viewed from the counter-substrate side.

FIG. 5 is a schematic plan view showing a second structure example of the structure of the pixel PX in the array substrate AR shown in FIG. 2, as viewed from the counter-substrate CT side.

The second structure example and the first structure example shown in FIG. 3 are the same in that the first edge ED1 of the common line C is non-linear, but are different with respect to the shape of the first edge ED1. Specifically, in the second structure example, the common line C includes a first projection portion CV1 and a second projection portion CV2, which project toward the first gate line GA and constitute a non-linear first edge ED1.

Also in the second structure example to which the common line C having this structure is applied, the edge length of the first edge ED1 can be increased. In particular, the most parts of the edges of the first projection portion CV1 and second projection portion CV2 do not overlap the slits SL. Thus, a sufficiently large area of the part that is other than the slits SL can be secured, and the occurrence of discontinuity of the second electrode E2 can be suppressed, as in the first structure example.

FIG. 6 is a schematic plan view showing a third structure example of the structure of the pixel PX in the array substrate AR shown in FIG. 2, as viewed from the counter-substrate CT side.

The third structure example differs from the first structure example shown in FIG. 3, in that the common line C includes a first end surface ES1 which is opposed to the first gate line GA, and a second end surface ES2 which is opposed to the second gate line GB, and the first end surface ES1 and second end surface ES2 have asymmetric shapes. The first end surface ES1 is formed at a first distance D1 from the first gate line GA. The second end surface ES2 is formed at a second distance D2, which is less than the first distance, from the second gate line GB.

FIG. 7 is a schematic cross-sectional view of the array substrate AR including the common line C shown in FIG. 6. FIG. 7 shows only the structure that is necessary for the description.

In the third structure example, the first end surface ES1 and second end surface ES2 have asymmetric cross-sectional shapes. Specifically, the first end surface ES1 is a gentle slanting surface which is inclined at a first angle θ1 to the first insulative substrate 20. The second end surface ES2 is a steep slanting surface which is inclined at a second angle θ2, which is greater than the first angle θ1, to the first insulative substrate 20.

The first electrode E1, first interlayer insulation film 21 and second interlayer insulation film 22 are stacked in the named order between the common line C, which includes the first end surface ES1 and second end surface ES2, and the second electrode E2. As regards the surface 22A of the second interlayer insulation film 22, a slanting surface SS1 is formed above the first end surface ES1, and a slanting surface SS2 is formed above the second end surface ES2. The slanting surface SS1, which is formed above the first end surface ES1, has a forward taper shape which is gentler than the slanting surface SS2 that is formed above the second end surface ES2. In short, the slanting surface SS1 is gentler than the slanting surface SS2.

Thus, the area where the second electrode E2 overlaps above the first end surface ES1 is greater than the area where the second electrode E2 overlaps above the second end surface ES2. Therefore, like the first structure example, the occurrence of discontinuity of the second electrode E2 can be suppressed.

The slit SL is not formed near the region immediately above the second end surface ES2. Specifically, as shown in the Figures, no such a slit SL is formed as to extend from immediately above the common line C toward the second gate line GB over the second end surface ES2.

In the meantime, in the case where the slit SL is also formed near the region above the second end surface ES2, it is desirable that the second end surface ES2 be formed as a gentle slanting surface, like the first end surface ES1, thereby to suppress the occurrence of discontinuity of the second electrode E2 above the second end surface ES2.

As has been described above, in order to suppress the occurrence of discontinuity of the second electrode E2, it is effective to sufficiently increase the area of the end surface of the underlayer wiring which overlaps the second electrode E2. However, this may cause a decrease in aperture ratio or an increase in nonuniformity of the aperture ratio. According to the study by the inventor, it was confirmed that it is desirable to set the angle between the end surface, which forms the gentle slanting surface, and the first insulative substrate 20 (e.g. the angle θ1 between the first end surface ES1 and the first insulative substrate 20) at 20° to 60°.

Figure 8:
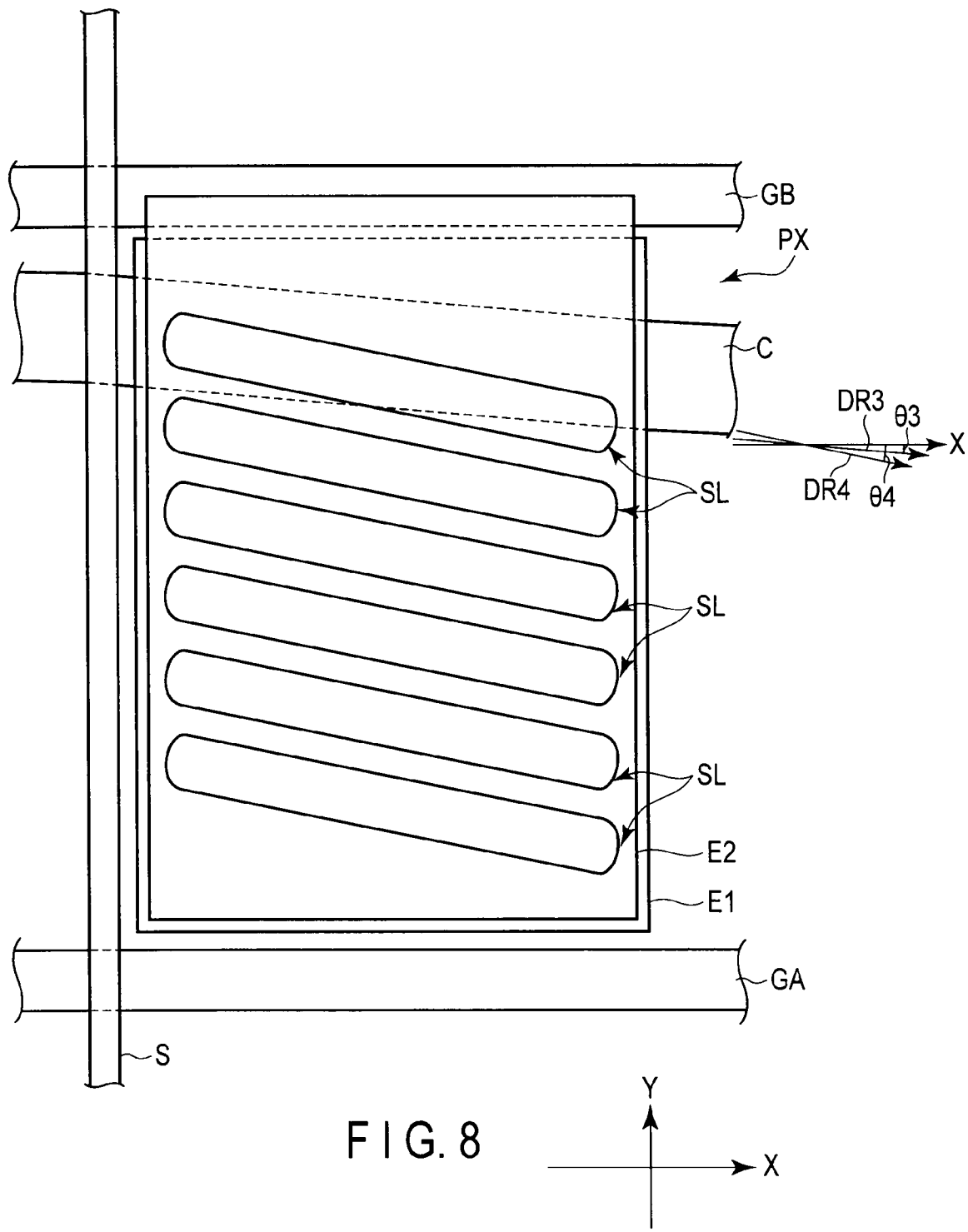
FIG. 8 is a schematic plan view showing a fourth structure example of the structure of the pixel in the array substrate shown in FIG. 2, as viewed from the counter-substrate side.

FIG. 8 is a schematic plan view showing a fourth structure example of the structure of the pixel PX in the array substrate AR shown in FIG. 2, as viewed from the counter-substrate CT side.

The fourth structure example differs from the first structure example shown in FIG. 3, in that the common line C is formed in a third direction DR3 crossing the first direction X and second direction Y, while the first gate line GA and second gate line GB are formed in the first direction X and the source line S is formed in the second direction Y.

The third direction DR3, in which the common line C extends, differs from a fourth direction DR4 in which the slit SL extends. In other words, the third direction DR3 crosses the fourth direction DR4. In the example illustrated, an angle θ3 between the first direction X and third direction DR3 is an acute angle which is less than an angle θ4 between the first direction X and fourth direction DR4.

In the fourth structure example, the common line C includes a first edge ED1 and a second edge ED2, which are substantially linear. The first distance D1 between the first gate line GA and the first edge ED1 gradually decreases from the left to the right in FIG. 8. Conversely, the second distance D2 between the second gate line GB and the second edge ED2 gradually increases from the left to the right in FIG. 8. In this manner, in the fourth structure example, the distance between the common line C, which overlaps the second electrode E2, and each of the first gate line GA and second gate line GB is not fixed.

In the example illustrated, the second edge ED2 does not overlap the slit SL. The first edge ED1 slightly overlaps the slit SL, but the most part of the first edge ED1 does not overlap the slit SL. By using such a layout that the first edge ED1 and second edge ED2 of the common line C do not substantially overlap the slits SL, a sufficiently large area of the part that is other than the slits SL and is left can be secured, and the occurrence of discontinuity of the second electrode E2 can be suppressed. Also in the fourth structure example, the same advantageous effects as in the above-described structure examples can be obtained.

Figure 9:
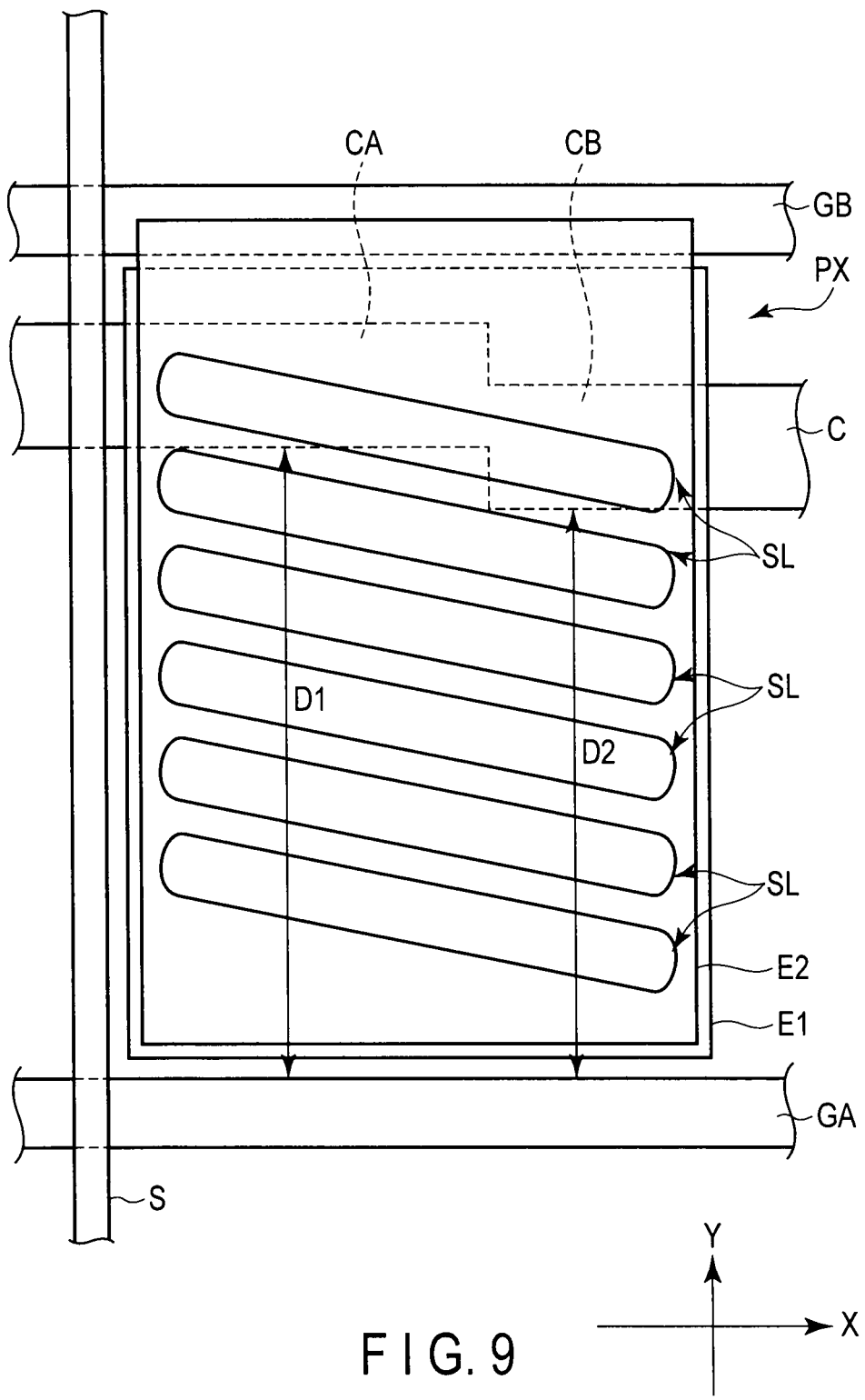
FIG. 9 is a schematic plan view showing a fifth structure example of the structure of the pixel in the array substrate shown in FIG. 2, as viewed from the counter-substrate side.

FIG. 9 is a schematic plan view showing a fifth structure example of the structure of the pixel PX in the array substrate AR shown in FIG. 2, as viewed from the counter-substrate CT side.

The fifth structure example differs from the first structure example shown in FIG. 3, in that the common line C includes a first wiring portion CA which is formed at a first distance D1 from the first gate line GA and a second wiring portion CB which is continuous with the first wiring portion CA and is formed at a second distance D2, which is greater than the first distance D1, from the first gate line GA, while the first gate line GA and second gate line GB are formed in the first direction X and the source line is formed in the second direction Y. In other words, the first wiring portion CA is disposed to be closer to the second gate line GB than the second wiring portion CB. Each of the first wiring portion CA and the second wiring portion CB is formed in a linear shape along the first direction X. Also in the fifth structure example, like the fourth structure example, the distance between the common line C, which overlaps the second electrode E2, and each of the first gate line GA and second gate line GB is not fixed.

In the example illustrated, the edge of the first wiring portion CA, which is located on the first gate line GA side, crosses the slit SL. The most part of the edge of the second wiring portion CB, which is located on the first gate line GA side, does not overlap the slit SL. By using such a layout that the part of the wiring portion, which constitutes the common line C, does not overlap the slits SL, a sufficiently large area of the part other than the slits SL can be secured, and the occurrence of discontinuity of the second electrode E2 can be suppressed. Also in the fifth structure example, the same advantageous effects as in the above-described structure examples can be obtained.

As has been described above, according to the present embodiment, a liquid crystal display device with a good display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate comprising an insulative substrate, a first gate line and a second gate line which are disposed above the insulative substrate, a common line, a first electrode, an insulation film, and a second electrode, the common line being disposed between the first gate line and the second gate line above the insulative substrate and comprising a first end surface, which is formed at a first distance from the first gate line and is inclined at a first angle to the insulative substrate, and a second end surface, which is formed at a second distance, which is shorter than the first distance, from the second gate line and is inclined at a second angle, which is greater than the first angle, to the insulative substrate, the first electrode being disposed between the first gate line and the second gate line above the insulative substrate and put in contact with the common line, the insulation film being disposed above the first electrode, and the second electrode being disposed above the insulation film, opposed to the first electrode, extending immediately above the first end surface of the common line, and comprising a slit formed therein;
a second substrate opposed to the first substrate; and
a liquid crystal layer held between the first substrate and the second substrate.

2. The liquid crystal display device of claim 1, further comprising:
a source line crossing the first gate line, the second gate line and the common line; and
a switching element electrically connected to the first gate line and the source line,
wherein the second electrode is electrically connected to the switching element.

3. The liquid crystal display device of claim 2, wherein the slit of the second electrode is formed in a direction crossing the common line and the source line.

4. The liquid crystal display device of claim 2, wherein the first angle is in a range of 20° to 60°.

5. The liquid crystal display device of claim 1, wherein the slit formed in the second electrode is configured not to extend over a region immediately above the second end surface.

* * * * *